United States Patent [19]

Usui et al.

[11] Patent Number: 5,006,188
[45] Date of Patent: Apr. 9, 1991

[54] METHOD FOR PRODUCING PLASTIC MOLDINGS

[75] Inventors: Mitsuji Usui; Takeo Hanamura; Junichi Kurihara, all of Wako, Japan

[73] Assignee: Honda Giken Kogyo Kabushiki Kaisha, Tokyo, Japan

[21] Appl. No.: 304,455

[22] Filed: Feb. 1, 1989

[30] Foreign Application Priority Data

Feb. 3, 1988 [JP] Japan .................................. 63-024406

[51] Int. Cl.⁵ .............................................. B29C 51/14
[52] U.S. Cl. ..................................... 156/245; 156/245; 156/285; 264/511; 264/241; 264/259
[58] Field of Search .................. 156/245, 285, 244.11, 156/244.12, 244.24, 214, 228; 264/241, 259, 260, 266, 511, 550, 554; 425/200, 205, 256, 258, 508, 516, 551, 556, 559, 560, 586

[56] References Cited

U.S. PATENT DOCUMENTS 3,453,162  7/1969  Turner .................................. 425/508
4,873,045 10/1989  Fujita et al. ........................ 156/244.24

FOREIGN PATENT DOCUMENTS 0124635  9/1980  Japan .................................. 264/511
0000911  1/1985  Japan .................................. 425/551
0024920  2/1985  Japan .................................. 264/511
2044414  2/1987  Japan .................................. 264/511

Primary Examiner—Caleb Weston
Attorney, Agent, or Firm—Armstrong, Nikaido, Marmelstein, Kubovcik, & Murray

[57] ABSTRACT

A method of producing a laminate of plastics moldings made of a skin material and a base resin material. The resin is melted and changed onto the skin material placed in a mold. The mold is then closed and cooled to produce the plastics moldings laminate. In charging the resin, it is stored outside the mold and is then loaded on the skin material in a single operation, which can avoid occurrence of flow marks or the like on the finished product and decrease the operation time. An apparatus for realizing the method is also disclosed.

6 Claims, 2 Drawing Sheets

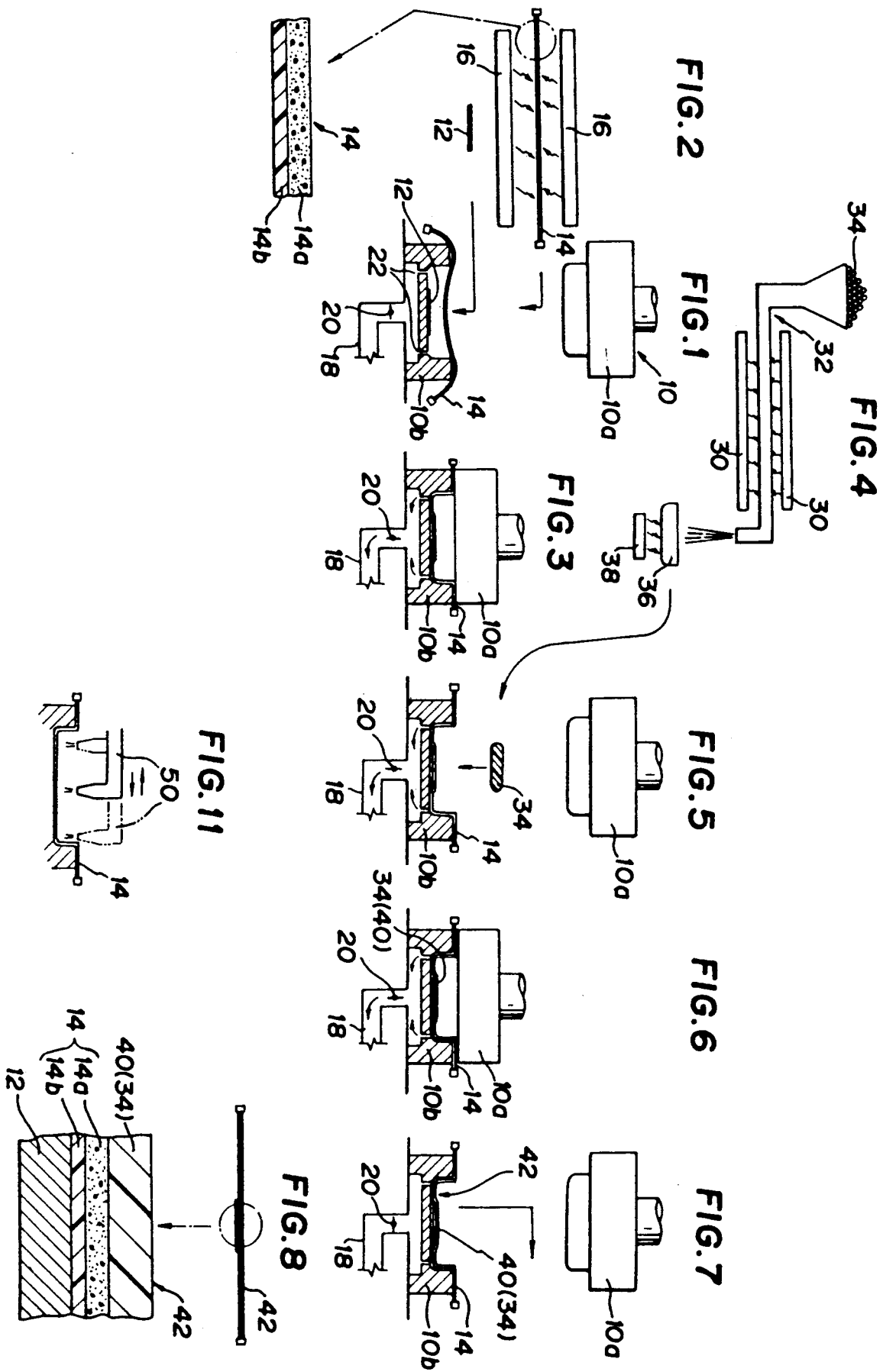

METHOD FOR PRODUCING PLASTIC MOLDINGS

BACKGROUND OF THE INVENTION

1. Field of the Invention

The present invention relates to a method and apparatus for producing plastics moldings made of laminations of different plastics for such applications as door linings in automobiles.

2. Description of the Prior Art

Plastics are employed extensively for the type of moldings that are used for the interior trim in automobiles. Such members are fabricated by using a suitable method to mold a lamination of different plastics. Melt stamping is one such forming method that is being used in the prior art. One example of this process that can be cited is that disclosed by Japanese Laid-open Patent Application 62-181111. As disclosed, the fabrication comprises of placing a skin material in a mold made of a mold plunger and a mold cavity and charging a molten resin thereonto, then closing the mold to apply pressure and cooling to form a laminate of plastics moldings. In charging or loading the molten resin, a jet nozzle was provided which could be moved as required by a motor downstream of the extruder, to jet in a staggered or zigzag line in accordance with the intended shape into which the resin was to be molded. Details of the injection orbits or paths are described in Japanese Patent Publication 59-17931. This method is generally referred to as flow molding.

However, because the prior art as described above moves the jet nozzle so that it follows a predetermined orbit or path while performing the injection, it has the drawback of requiring considerable time for the completion of the injection, 12 seconds, for example, thus extending the operation time. In addition, because of the length of the injection time, there is a difference in the temperature of the resin of around 30° C. between the start of the jetting and the temperature at the completion of the jetting. Applying pressure in this state is undesirable because of the adverse effects on the quality of the product, in the form of flow marks and weld marks and the like. Furthermore, even if an injection orbit suitable for the shape of the finished product is used, it has been impossible to avoid deflection in the specified orientation characteristics corresponding to the injection orientation.

Because, as mentioned above, there is non-uniformity in temperature between the beginning and the end of the injection, the extrusion temperature has had to be increased in order to ensure the requisite temperature in molding. This also results in a higher injection temperature, and when the molten base resin is charged onto skin material made of a foam, a protective barrier sheet has been necessary.

SUMMARY OF THE INVENTION

In view of the problems in the prior art as mentioned above, an object of the present invention is to provide a method for producing plastics moldings wherein the process of injection into the mold is eliminated and the operation time is therefore reduced, enabling the non-uniformity in the base resin temperature to be avoided in addition to which there is no deflection in orientation characteristics in the specified direction.

Another object is to provide a method for producing plastics moldings wherein by avoiding the non-uniformity in the base resin temperature, extrusion can be carried out at a relatively lower temperature, as a result of which there is no need for the protective barrier sheet even when the skin material is made of a foam.

It is also an object of the present invention to provide an apparatus for producing plastics moldings in accordance with the method as mentioned above.

For achieving the objects, the present invention provides a method for producing plastics moldings made of a laminate of skin material and a base resin comprising, placing the skin material in a mold, melting the base resin and charging it onto the skin material in the mold and closing the mold and cooling to form the laminate of plastics moldings. In the method, the improvement is that said molten resin is charged on the skin material at one go after having been stored outside the mold.

In accordance with the second aspect of the invention, there is provided an apparatus for producing plastics moldings made of a laminate of a skin material and a base resin, including means for melting the base resin by the application of heat and pressure, a mold having a mold plunger and a mold cavity to receive the skin material and means for receiving the molten resin from the resin molten means and charging it onto the skin material placed in the mold to form the laminate of plastics moldings after the mold is closed to cool. In the apparatus, said resin melting means is provided with means for storing the molten resin outside the mold such that the molten resin is charged onto the skin material through the storage means at one go.

Further features of the invention, its nature and various advantages will be more apparent from the accompanying drawings and the following detailed description of the invention.

BRIEF DESCRIPTION OF THE DRAWINGS

FIGS. 1 to 8 inclusive are explanatory views showing each process of the method for producing plastics moldings according to the invention;

FIG. 11 is a view partially showing a process in the prior art corresponding to that shown in FIG. 5.

DESCRIPTION OF THE PREFERRED EMBODIMENTS

Figure 10:
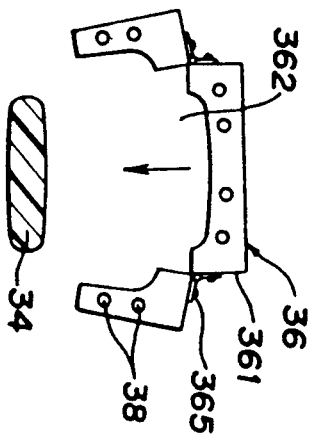
FIG. 10 is an end view of the apparatus shown in FIG. 9 for explaining the operation of a storage device used in the apparatus.

FIGS. 1 to 8 are views showing overall process for producing plastics moldings according to the invention. The illustrated example shows the production of interior trim used for the door lining of automobiles. With reference to FIG. 1, a mold 10 consisting of a mold plunger 10a and a mold cavity 10b is opened and a pad 12 and skin material 14 are placed thereon. The pad 12 is made of woven or non-woven cloth having a pile or a paper material and is finished to form a decoration which goes on the topmost surface on the interior side of a vehicle. As can be seen clearly in the enlarged view of FIG. 2, the skin material 14 is a two-ply laminate formed of a cushion layer 14a made of a foam material and a skin layer 14b. Polypropylene foam, polyurethane foam, polyethylene foam and polyvinyl chloride foam are examples that may be used for the cushion layer, and polyvinyl chloride or the like may be used for the skin layer. As shown in FIG. 2, the skin material 14 is preheated to, for example, 180° C. by a separate process using heaters 16. The surface of the pad 12 facing the skin material is coated with an adhesive which will be activated at a later stage by exposure to heat. The mold cavity 10b is connected to a vacuum source (not shown) by a pipe 18 in which is provided an on-off valve 20. More specifically, the pipe communicates with the cavity by means of numerous holes 22, only two are shown in the drawing, so as to enable vacuuming forming be carried out. In this process, as described above, the pad 12 and the preheated skin material 14 are positioned in the mold.

Next, as shown in FIG. 3, the mold is closed and pressure is applied while the mold cavity 10a is deaerated. The vacuum forming is for bringing the skin material 14 down onto the mold and embossing thereon a desired pattern by appropriate depressions formed on the mold, and it is also for cooling the skin material 14 down to around room temperature, for example 35° C. In the state described above, the pad 12 and the skin material 14 are bonded together by the adhesive coating on the pad surface.

As shown in FIG. 4, in parallel with the process shown in FIGS. 1 to 3, a resin 34 in pellet form is melted by heat and pressure applied by means of an extruder 32 equipped with heaters 30 and the molten resin 34 is stored temporarily in a suitable storage device 36. The storage device 36 has a cavity for storing the molten resin which resembles to a shape of a finished product into which the resin will be formed, as will be explained at a later stage. The storage device 36 may preferably be provided with a heater 38, for maintaining the molten resin at a specified temperature, for example 190° C. Polypropylene or ABS or the like may be used for the base resin 34.

Next, as shown in FIG. 5, the mold is opened and the stored molten 34 is charged at one go or in a single operation, in its stored shape, onto the skin material 14, or more specifically, onto the cushion (foam) layer 14a. Here, as the molten resin goes onto the skin material and not onto the mold, there is no degradation in the quality of the product such as the flow marks or weld marks sudden cooling produces when the resin comes into contact with the walls of the mold.

Continuing, as shown in FIG. 6, the mold is closed and pressure is again applied while the mold cavity is kept deaerated. This operation is mainly for cooling the molten resin. This pressurizing and cooling process causes the molten base resin 34 to be a hardened base material 40 that, like the skin material 14, is in the form of a sheet, and to laminate it with the skin material in the lower part and further with the lowermost pad to produce a plastics moldings 42.

Next, as shown in FIG. 7, the mold may be opened and the plastics moldings 42 removed. FIG. 8 shows an overall view and an enlarged detail of the plastics moldings 42 thus laminated. It can be seen that the moldings 42 has a four-ply construction made up of the base material 40 (the former resin 34), the cushion (foam) layer 14a, the skin layer 14b and the pad 12. The plastics moldings 42 thus formed is attached to the inner panel of a vehicle door (not shown), for example, with the skin layer and pad facing toward the outside for decoration.

The method of producing the plastics moldings in accordance with the present invention is thus as described above. The characterizing features of this method will be explained further compared with the prior art shown in FIG. 11 which partially shows a similar process as that shown in FIG. 5. With reference to FIG. 11, a jetting nozzle 50 in the prior art is moved back and forth and to each side over the mold to describe a zigzag shape. As a result, the charging operation takes a long time to complete, perhaps 12 seconds, for example, and as the operation time is prolonged there is a difference between the temperature of the molten resin at the beginning and the end, and if it is pressurized in this state flow marks, weld marks and the like are produced which have an undesirable effect on the quality of the product, in addition to which, depending on the injection orientation the base material can take on regular orientation characteristics, which is undesirable. In the case of the method according to the present invention, however, the molten resin is temporarily held in a shape similar to the shape into which the base resin material is to be formed in a separate process and is promptly loaded into the mold at one go as soon as the mold is opened, reducing the operation time. There is also an advantage in that because there is no change in the temperature of the resin, product quality is not degraded by the production of flow marks or weld marks, for example, in addition to which an optimum resin flow can be realized during the ensuing pressurization step in the storage process, giving the resin flow irregular, random orientation characteristics. Furthermore, because it is temporarily stored before charging there is no change in the temperature of the resin. Also, if the heater 38 is used during storage, it enables the temperature to be maintained at a specified level, which makes extrusion possible under lower temperature, so that even if the molten resin is charged onto the cushion (foam) layer 14a as disclosed, the foam layer does not undergo a change in its properties, rendering a barrier sheet unnecessary. In the prior art, owing to the fact that there is a drop in the temperature of the resin, the resin is extruded at a relatively high temperature for charging onto the skin foam layer, which gives rise to, for example, rupture, swelling, deformation and collapse of the foam layer, prevention of which requires the use of the barrier sheet.

Figure 9:
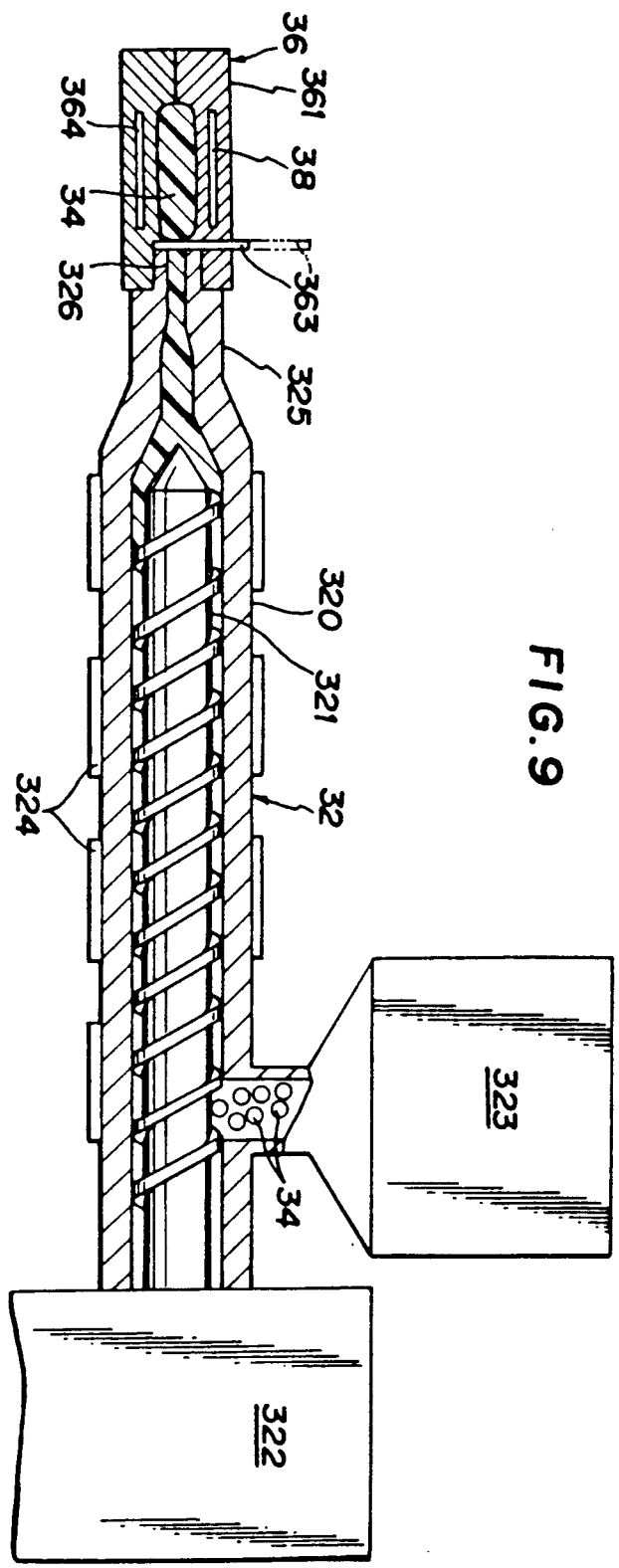
FIG. 9 is an explanatory sectional view showing an apparatus for producing the plastics moldings used in the method of FIGS. 1 to 8.

FIGS. 9 and 10 show an apparatus for producing the moldings according to the method of the invention. In FIG. 9, a screw 321 is provided in a cylinder 320 of the extruder 32 previously shown in FIG. 4, the screw 321 being rotated by the driving force of a motor (not shown) via a reduction gear 322 and crushing pellets of the resin 34 entering from a hopper 323. The cylinder 320 is provided with heaters 324 to melt the crushed resin which is discharged from a nozzle 326 of a cylinder nose 325. Attached to the cylinder nose 325 is the storage device 36 which, as shown in FIG. 10, is provided with an openable box-like part 361. The upper part of the box-like part 361 forms a cavity 362 that has a shape that corresponds to or resembles the final shape of the base material 40 shown in FIG. 8. The cavity 362 is communicated with the discharge nozzle 326 of the extruder to receive the molten resin. The entrance of the cavity 362 is provided with a shutter 363 which can be opened and closed vertically to control the flow of resin. Preferably, an appropriate number of heaters 38 are provided in the vicinity of the cavity 362 to maintain the molten resin at a specified temperature, as described with reference to FIG. 4. FIG. 10 is an end view of the storage device 36 showing the box-like part 361 that can be opened by means of hinges 365, so that the stored resin 34 is dropped, as shown, on the skin material 14 in the mold (FIG. 5) while maintaining the shape it had in the cavity. The inner surface of the cavity 362 has been treated to prevent resin from adhering to it.

Having a cavity that corresponds to or resembles the shape of the base material provides an optimum resin flow for shaping the base material thus, which improves formability. In addition, because the resin is charged in its stored shape and is not injected with a specific orientation, the orientation characteristics are improved. Although the shape of the cavity does correspond to or resemble the shape of the base material, strict correspondence or resemblance in shape is not essential. As also described above, maintaining the stored resin at a prescribed temperature by means of the heaters 38 enables it to be applied onto the cushion layer without the use of a barrier sheet and without causing any changes to the properties of the skin cushion layer. Furthermore, using the storage device instead of the movable jetting nozzle in the prior art provides a simple construction, so the present invention also has secondary effects such as that it enables a working robot to be used for realizing the method in factory.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A method for producing plastic molding made of a laminate of a skin material and a base material, having the steps of:

placing the skin material in a mold;

melting a predetermined quantity of the base resin and charging it onto the kin material in the mold; and closing the mold and cooling to form the laminated plastic molding; wherein the improvement comprises;

all of said quantity of said molten resin being charged onto the skin material after having been stored outside the mold in a molten state and in a shape that corresponds to or resembles the shape of the plastic molding being produced.

2. A method according to claim 1, wherein the skin material includes a skin layer made of polyvinyl chloride.

3. A method according to claim 1, wherein said molten resin is maintained at a prescribed temperature during storage.

4. A method according to claim 3, wherein said skin material is provided with a foam layer and the molten resin is charged onto the foam layer.

5. A method according to claim 1, wherein the base resin is a polymer from the group consisting of polypropylene or ABS.

6. A method according to claim 1, wherein the skin material includes a form material made of plastic selected from the group consisting of polypropylene, polyurethane, polyethylene or polyvinyl chloride.

* * * * *